United States Patent
Sillanpää et al.

(10) Patent No.: US 12,181,318 B2
(45) Date of Patent: Dec. 31, 2024

(54) ULTRASOUND SENSOR APPARATUS AND METHOD OF TRANSMITTING OF ULTRASOUND

(71) Applicant: TEKNOLOGIAN TUTKIMUSKESKUS VTT OY, Espoo (FI)

(72) Inventors: Teuvo Sillanpää, Espoo (FI); Cyril Karuthedath, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 18/555,785

(22) PCT Filed: Apr. 13, 2022

(86) PCT No.: PCT/FI2022/050246
§ 371 (c)(1),
(2) Date: Oct. 17, 2023

(87) PCT Pub. No.: WO2022/223877
PCT Pub. Date: Oct. 27, 2022

(65) Prior Publication Data
US 2024/0200996 A1    Jun. 20, 2024

(30) Foreign Application Priority Data
Apr. 20, 2021    (FI) .................................. 20215462

(51) Int. Cl.
*G01F 1/667*    (2022.01)

(52) U.S. Cl.
CPC .................................. *G01F 1/668* (2013.01)

(58) Field of Classification Search
CPC ....................................................... G01F 1/668
See application file for complete search history.

(56) References Cited

U.S. PATENT DOCUMENTS

| 5,831,175 | A | 11/1998 | Fletcher-haynes |
| 6,305,233 | B1 | 10/2001 | Braathen et al. |
| 6,708,570 | B2 * | 3/2004 | Matsushima ........... G01F 1/667 73/861.28 |

(Continued)

FOREIGN PATENT DOCUMENTS

| CN | 110243421 B | 5/2020 |
| EP | 1985974 A2 | 10/2008 |

(Continued)

OTHER PUBLICATIONS

International Search Report for PCT/FI2022/050246 mailed Jul. 15, 2022, 4 pages.

(Continued)

*Primary Examiner* — Peter J Macchiarolo
*Assistant Examiner* — John M Royston
(74) *Attorney, Agent, or Firm* — Nixon & Vanderhye PC

(57) ABSTRACT

An ultrasound sensor apparatus comprises at least one ultrasound transmitter, which outputs ultrasound into fluid, and a frequency controller, which receives information on temperature of the fluid and controls the frequency of the ultrasound output by the at least one ultrasound transmitter as a function of the temperature of the fluid.

17 Claims, 3 Drawing Sheets

(56) References Cited

U.S. PATENT DOCUMENTS

| | | | |
|---|---|---|---|
| 2006/0079815 A1 | 4/2006 | Sato et al. | |
| 2012/0194973 A1 | 8/2012 | Baliga et al. | |
| 2012/0271568 A1 | 10/2012 | Wilson | |
| 2012/0271569 A1* | 10/2012 | Wilson | G01F 1/66 |
| | | | 702/48 |
| 2020/0209031 A1 | 7/2020 | Dabak et al. | |

FOREIGN PATENT DOCUMENTS

| | | |
|---|---|---|
| JP | S58211667 A | 12/1983 |
| JP | H1114649 A | 1/1999 |
| JP | 2018136276 A | 8/2018 |
| WO | 2012085335 A1 | 6/2012 |
| WO | 2018096215 A1 | 5/2018 |
| WO | 2019040089 A1 | 2/2019 |

OTHER PUBLICATIONS

Written Opinion of the ISA for PCT/FI2022/050246, mailed Jul. 15, 2022, 6 pages.
International Preliminary Report on Patentability for PCT/FI2022/050246 completed Mar. 28, 2023, 13 pages.
Search Report for FI20215462 dated Nov. 10, 2021, 2 pages.
Office Action for FI20215462 dated Feb. 23, 2023, 12 pages.

* cited by examiner

US 12,181,318 B2

ULTRASOUND SENSOR APPARATUS AND METHOD OF TRANSMITTING OF ULTRASOUND

This application is the U.S. national phase of International Application No. PCT/FI2022/050246 filed Apr. 13, 2022, which designated the U.S. and claims priority to FI Patent Application No. 20215462 filed Apr. 20, 2021, the entire contents of each of which are hereby incorporated by reference.

FIELD

The invention relates to an ultrasound sensor apparatus and a method of transmitting of ultrasound.

BACKGROUND

The ultrasound sensors, such as flow sensors, suffer from zero point drift as a function temperature and ageing. The ultra sound sensors typically work at a resonance. However, aging changes the resonance frequency and lowers quality of resonance. For example in household water flow meters and heating, ventilation, and air conditioning (HVAC) air flow meters, the operation time is more than ten years.

There have been several attempts to overcome both the drift and the aging. Sensors have been carefully chosen and mechanical design has been kept as precise as possible. As perfectly matched sensors as possible and symmetrical structures that have tight manufacturing tolerance requirements are used for minimizing the problem, but the compensation still leaves room for improvement. Additionally, they increase manufacturing throughput time, complexity and cost.

Temperature compensation and calibration in different temperatures have also been tried but they do not actually solve the problem either. Hence, an improvement would be welcome.

BRIEF DESCRIPTION

The present invention seeks to provide a novel ultrasound sensor apparatus and a novel ultrasound transmission method.

The invention is defined by the independent claims. Embodiments are defined in the dependent claims.

LIST OF DRAWINGS

Example embodiments of the present invention are described below, by way of example only, with reference to the accompanying drawings, in which FIG. 1 illustrates an example of a measurement of flowing fluid;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

Figure 1:
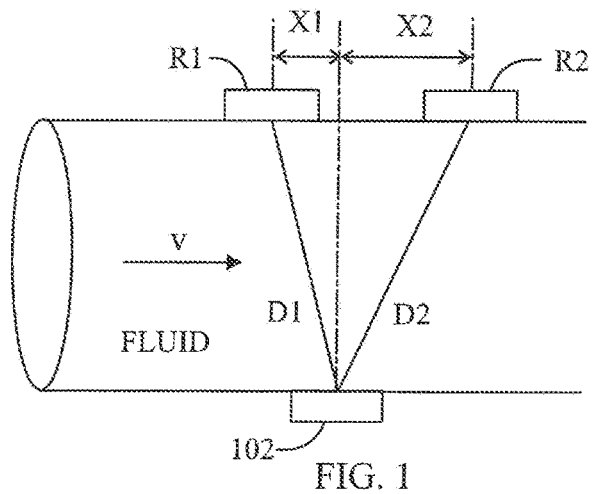

FIG. 1 illustrates an example of a measurement of flowing fluid. The flow of fluid has a speed v which may be constant with respect to time or it may vary as function of time. The fluid may flow in a tube, for example.

The fluid is flowable matter. The fluid may be gas or liquid. If the fluid is liquid, the fluid may be composed of only one liquid or it may be a mixture of two or more different liquids. Alternatively, if the fluid is gas, the fluid may be composed of only one gas or it may be a mixture of two or more different gases. Alternatively the fluid may be a mixture of at least one liquid and at least one gas. The gas may be composed of only one gas or it may be a mixture of two or more gases. Furthermore, the fluid may be suspension or emulsion, for example.

The ultrasound is sound in a frequency range in which a lowest frequency is higher than the highest audible frequency that a human being can hear. The ultrasound is often defined to be a sound with one or more frequencies above 20 kHz. The range of ultrasound may be within a frequency range 20 kHz-20 MHz, for example.

In the example of FIG. 1, an ultrasound sensor arrangement may comprise a transmitter 102 and two receivers R1 and R2. The ultrasound transmitter 102 transmits ultrasound through the flowing fluid towards the receivers R1 and R2 in order to measure the speed v of the fluid. A phase difference $\Delta\theta$ between the ultrasound signals detected by the receivers R1 and R2 can be mathematically expressed as:

$$\Delta\theta = \frac{k}{1-M^2}\left[M(X1+X2) + \sqrt{X1^2 + (1-M^2)D1^2} - \sqrt{X2^2 + (1-M^2)D2^2}\right],$$

where k is wavenumber of the ultrasound and can be expressed as $$k = \frac{2\pi f}{c},$$

where f is frequency of the ultrasound, M is Mach number expressing relation v/c between the speed of sound c and the speed of the flowing fluid v, X1 is distance between the ultrasound transmitter 102 and the first receiver R1, X2 is a distance between the ultrasound transmitter 102 and the second receiver R2. In this example, the ultrasound is considered to have only one frequency f and thus only one wavenumber k.

If the distances X1 and X2, D1 and D2 are the same, X1=X2 and D1=D2, the difference of the square roots multiplied by the wavenumber k, $$k\left(\sqrt{X1^2 + (1-M^2)D1^2} - \sqrt{X2^2 + (1-M^2)D2^2}\right),$$

which may be called an error term, can be eliminated and becomes thus 0. But if that condition is not met, which happens in practice because of assembly inaccuracy and deformations which in turn are caused temperature variation. A result is a zero offset error caused by temperature variation to the measurement performed by the transmitter 102 and the receivers R1 and R2. Namely, the speed of sound c is a function of temperature T, and the dependence may be expressed to be at least approximately:

$$c = 20.05\sqrt{T - 273.15K},$$

where K denotes Kelvin in Kelvin scale.

Because the wavenumber k depends on the speed c of sound $$k = \frac{2\pi f}{c},$$

the phase difference also depends on the temperature T if the symmetry condition is not met. In the prior art, the temperature T of the fluid has been tried to keep constant (see patent document WO2012085335) to overcome the technical problem. The temperature of the fluid cannot be kept constant in real life. However, this cumbersome solution of keeping the temperature of the fluid constant may be made unnecessary when the problem of the ultrasound measurement is solved in a manner disclosed in this document, although the solution of keeping temperature of the fluid constant may be used together with what is taught in this document.

Figure 2:
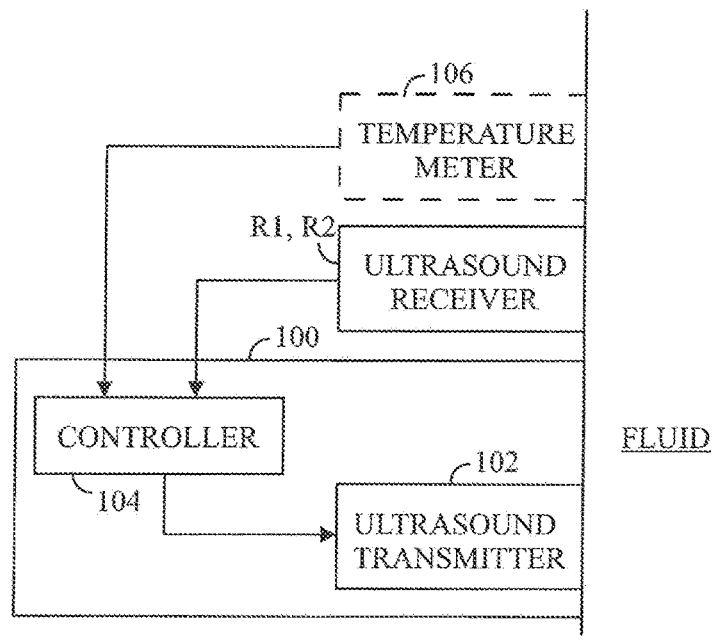
FIG. 2 illustrates an example of the ultrasound sensor apparatus.

FIG. 2 illustrates an example of the ultrasound sensor apparatus. The ultrasound sensor apparatus 100 comprises at least one ultrasound transmitter 102 and a frequency controller 104. The at least one ultrasound transmitter outputs ultrasound into fluid. The frequency controller 104 receives information on temperature of the fluid and controls the frequency of the ultrasound output by the at least one ultrasound transmitter 102 as a function of the temperature of the fluid.

Figure 3:
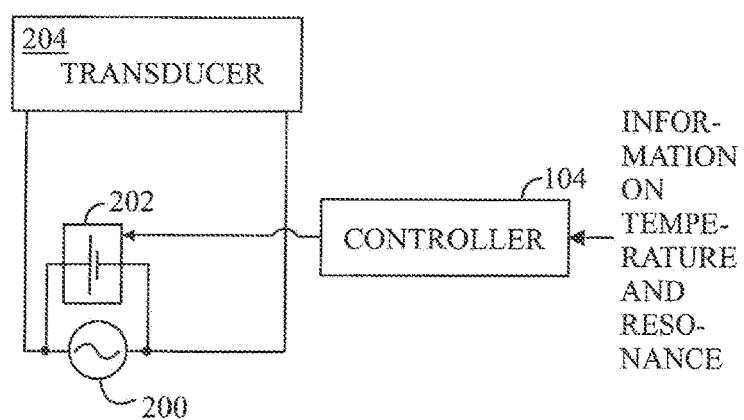
FIG. 3 illustrates an example of driving configuration of a transducer.

FIG. 3 illustrates an example of driving configuration of a transducer 204 of the ultrasound sensor apparatus 100. The transducer 204, which can be considered to comprise the transmitter 102 and potentially also the receiver R1, R2, may be tuned to operate at a resonance frequency by adjusting a direct current (DC) bias of the transducer 204 with a regulable DC voltage source 202. The DC voltage source 202 may be coupled in parallel with an alternate current (AC) voltage source 200. Alternatively the DC voltage source 202 may be coupled in series with the AC voltage source 200. With the DC voltage source 202 tunes the transducer 204 to a desired resonance frequency. A person skilled in the art is familiar with the tuning of the transducer 204, per se. The controller 204 comprises necessary equipment or electronics for obtaining the actual information or variable for the control.

In an embodiment, the frequency controller 104 may adjust relation between the frequency and the speed of the ultrasound in the fluid as a function of the temperature of the fluid. Because the speed c of the ultrasound increases with increasing temperature, also the wavelength becomes longer. That, in turn, causes the wavenumber k to become smaller. The relation S of the speed c and the wavenumber k is S=c/k and the relation S will increase with larger speed c and smaller wavenumber k. That is why the frequency controller 104 may increase the frequency such that the wavenumber k becomes larger. When the temperature T goes down, the frequency controller 104 may decrease the frequency such that the wavenumber k becomes smaller.

In an embodiment, the frequency controller 104 may keep relation between frequency and speed of the ultrasound in the fluid constant as a function of the temperature of the fluid. That is, when the ultrasound sensor apparatus 100 is calibrated at a certain temperature $T_0$ before the assembly, the controller 104 may keep the relation constant if or when the temperature T varies. If the temperature goes up, the speed of ultrasound c goes also up and hence the controller 104 also increases the frequency of the ultrasound output by the ultrasound transmitter 102. Then the frequency controller 104 may adjust the frequency such that the wavenumber k becomes larger to make the relation S constant i.e. $S=c_0/k_0=c_1/k_1$, where $c_0$ and $k_0$ are the original speed and wavenumber, respectively, in an original condition and $c_1$ and $k_1$ are speed and wavenumber is temperature different from the original condition.

In an embodiment, the ultrasound sensor apparatus 100 may also comprise one or more ultrasound receivers R1, R2. The ultrasound sensor apparatus 100 may measure the temperature of the fluid based on one or more averages of time-of-flights of the ultrasound that has travelled through the fluid and is received by the one or more ultrasound receivers R1 and R2. The time-of-flight may be measured indirectly as phase shifts or by measuring the time-of-flights using a timer. In an embodiment, the ultrasound sensor apparatus 100 comprises a transceiver or transducer which both transmits and receives ultrasound signals.

In an embodiment, the ultrasound sensor apparatus 100 may comprise a temperature meter 106, which measures the temperature of the fluid, and may feed the information on said temperature of the fluid to the frequency controller 104. In an embodiment, the temperature meter 106 may comprise a semiconductor temperature sensor. In an embodiment, the temperature meter 106 may comprise a resistance temperature sensor, a pyrometer, a thermistor, a thermocouple, for example. Additionally or alternatively, the temperature meter 106 may be configured to detect temperature of the fluid based on an infrared measurement.

FIG. 3 illustrates the ultrasound sensor apparatus 100. Since the ultrasound sensor apparatuses typically works in a resonance mode and the resonance frequency of the piezoelectric micro-machined ultrasonic (PMUT) or (capacitive micro-machined ultrasonic) CMUT sensor can be tuned by DC voltage, the transceiver resonances can be tuned to be same as the operation frequency. In other words, the sensor resonance is or the at least one ultrasound transmitter 102 locked to driving frequency that is controlled by the controller 104. The resonance tuning can be used to alleviate or eliminate ageing and need for precise sensor matching.

In an embodiment, the frequency controller 104 may receive information on resonance or a change of the resonance of the ultrasound sensor apparatus 100, the resonance or the change of the resonance being formed and/or stored as a function of time. The frequency controller 104 may then adjust the frequency of the ultrasound output by the at least one ultrasound transmitter 102 based on the resonance or the change and time defining the moment of the resonance or the change.

In an embodiment, the frequency controller 104 may estimate information on resonance or a change of the resonance of the ultrasound sensor apparatus 100, the resonance or the change of the resonance being formed and/or stored as a function of time. The frequency controller 104 may then adjust the frequency of the ultrasound output by the at least one ultrasound transmitter 102 based on the resonance or the change and time defining the moment of the resonance or the change.

In an embodiment, the frequency controller 104 may have information on resonance or a change of the resonance of the ultrasound sensor apparatus 100 in its memory, the resonance or the change of the resonance being stored as a function of time. The frequency controller 104 may then the frequency of the ultrasound output by the at least one ultrasound transmitter 102 based on the resonance or the change and time defining the moment of the resonance or the change. The ultrasound sensor apparatus 100 may have the information in a table form in the memory. In an embodiment, the frequency controller 104 may have the information in its memory (see FIG. 5). The information on the resonance or the change of the resonance as a function of time may be stored in the memory during manufacturing process, for example.

Figure 4:
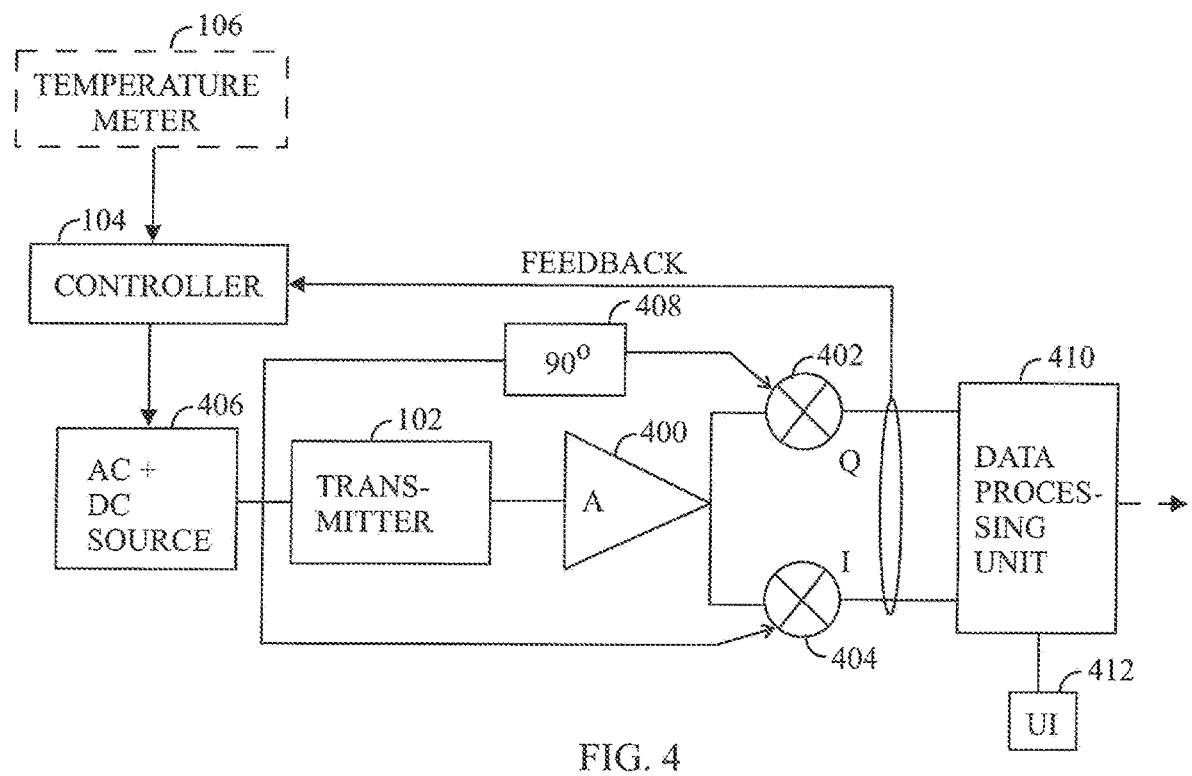
FIG. 4 illustrates more in details an example of the ultrasound sensor apparatus.

FIG. 4 illustrates a little bit more in details the ultrasound sensor apparatus 100. Output from the transmitter 102 may be led to an amplifier 400. The output of which may be fed to frequency multipliers 402 and 404. The multiplier 402 may output a voltage or other electric signal based on a phase difference of the multiplied signals, which include a signal from the amplifier 400, and a signal from the AC source 202 of a driving source 406 having 90° phase shift. The 90° phase shift may be performed by a phase shifter 408, which may be analog or digital. This branch may be called Q-phase.

The multiplier 404 may also output a voltage based on a phase difference of the multiplied signals, which include a signal from the amplifier 400, and a signal from the AC source 202 of a driving source 406. This branch may be called I-phase, and this kind of IQ-phased signal processing may be called a quadrature detection. At least one of the outputs of the multipliers 400, 402 may be fed back to the frequency controller 104. This kind of feedback may be considered a phase-lock-loop, and it may be used to control output frequency drift. The Q-phase signal may be used as measurement signal of the ultrasound apparatus 100 and it may with the I-phase signal be input to a data processing unit 410, which include the frequency controller 104 although in FIG. 4 the two are drawn separately. The flow of the fluid can be calculated based on the I- and Q-signals in the controller 104.

The data processing unit 410 may include or be in contact with a user interface 412, which may present information on the ultrasound measurement of the fluid to a user. The user interface 412 may comprise a screen, a keyboard and/or a touch screen for inputting data to the ultrasound apparatus 100. The data processing unit 410 may have a wired or wireless connection to a data network such as a local network and/or the Internet, for example, for data transfer and/or control of the ultrasound apparatus 100.

Figure 5:
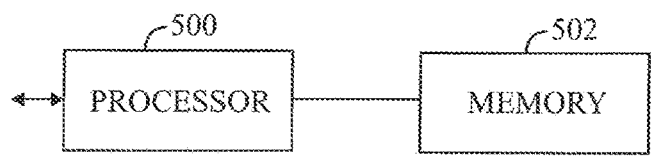
FIG. 5 illustrates an example of the frequency controller of the ultrasound sensor apparatus.

FIG. 5 illustrates an example of the frequency controller 104 and/or the data processing unit 410. The frequency controller 104 and/or the data processing unit 410 may comprise one or more processors 500, and one or more memories 502 including computer program code. The one or more memories 502 and the computer program code may, with the one or more processors 500, cause the frequency controller 104 and/or the data processing unit 410 at least to control the frequency of the ultrasound output by the at least one ultrasound transmitter 102 as a function of the temperature of the fluid.

What is explained above may have several technical advantages. Sensors' accuracy may be better. Requirement for a perfectly matched sensor may be avoided. Sensitivity may be good because the ultrasound sensor apparatus may be kept always in resonance, which may be critical for air coupled PMUTs and CMUTs, for example. Mechanical design may be non-critical. Need for calibration may be reduced. The zero offset correction may be performed during operation of the ultrasound sensor apparatus 100, and it may be performed continuously, regularly or irregularly.

Figure 6:
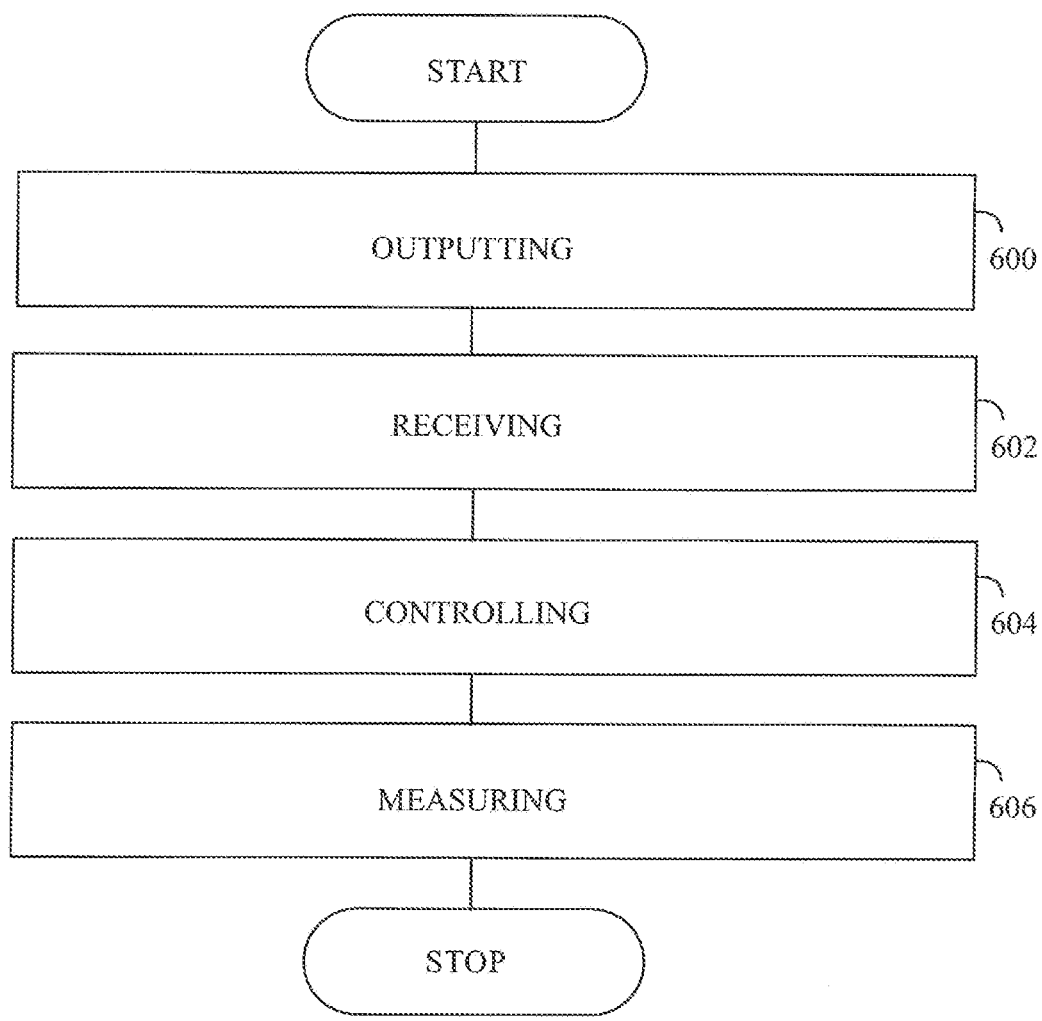
FIG. 6 illustrates of an example of a flow chart of a transmitting method.

FIG. 6 is a flow chart of the transmitting method. In step 600, ultrasound is output into fluid by at least one ultrasound transmitter 102 of an ultrasound sensor apparatus 100.

In step 602 information on temperature of the fluid is received by a frequency controller 104 of the ultrasound sensor apparatus 100.

In step 604, the frequency of the ultrasound output by the at least one ultrasound transmitter 102 is controlled as a function of the temperature of the fluid by the frequency controller 104.

In step 606, which is optional, the temperature of the fluid may be measured by a temperature meter 106; and the information on said temperature may be fed to the frequency controller 104 of the ultrasound sensor apparatus 100.

The method shown in FIG. 6 may be implemented as a logic circuit solution or computer program. The computer program may be placed on a computer program distribution means for the distribution thereof. The computer program distribution means is readable by a data processing device, and it encodes the computer program commands, carries out the measurements and optionally controls the processes on the basis of the measurements.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

The invention claimed is:

1. An ultrasound flow sensor apparatus, wherein the ultrasound flow sensor apparatus comprises at least one ultrasound transmitter, which is configured to output ultrasound into flowing fluid, a frequency controller, which is configured to receive information on temperature of the fluid and feedback from the at least one ultrasound transmitter, and lock a frequency of the ultrasound output to driving frequency of the at least one ultrasound transmitter in order to control the frequency of the ultrasound output by the at least one ultrasound transmitter as a function of the temperature of the fluid.

2. The apparatus of claim 1, wherein the frequency controller is configured to adjust relation between ultrasound frequency and speed of the sound in the fluid as a function of the temperature of the fluid.

3. The apparatus claim 1, wherein the frequency controller is configured to keep relation between ultrasound frequency and speed of the sound in the fluid constant as a function of the temperature of the fluid.

4. The apparatus of claim 1, wherein the ultrasound sensor apparatus comprises one or more ultrasound receivers, and the ultrasound sensor apparatus is configured to measure the temperature of the fluid based on one or more averages of time-of-flights of the ultrasound that has travelled through the fluid and is received by the one or more ultrasound receivers.

5. The apparatus of claim 1, wherein the ultrasound sensor apparatus comprises a temperature meter, which is configured to measure the temperature of the fluid and feed the information on said temperature to the frequency controller.

6. The apparatus of claim 1, wherein the frequency controller comprises one or more processors; and one or more memories including computer program code; and
the one or more memories and the computer program code are configured to, with the one or more processors, cause apparatus at least to: control the frequency of the ultrasound output by the at least one ultrasound transmitter as a function of the temperature of the fluid.

7. A method of transmitting of ultrasound for measuring flow, the method comprising
outputting, by at least one ultrasound transmitter of an ultrasound sensor apparatus, ultrasound into fluid;
receiving, by a frequency controller of the ultrasound sensor apparatus, information on temperature of the fluid and feedback from the at least one ultrasound transmitter; and
controlling, by the frequency controller, the frequency of the ultrasound output by the at least one ultrasound transmitter as a function of the temperature of the fluid comprising locking a frequency of the ultrasound to driving frequency of the at least one ultrasound transmitter.

8. The method of claim 7, the method further comprising controlling the frequency of the ultrasound by adjusting relation between frequency and speed of the ultrasound in the fluid as a function of the temperature of the fluid.

9. The method of claim 7, the method further comprising controlling the frequency of the ultrasound by keeping a relation between frequency and speed of the ultrasound in the fluid constant as a function of the temperature of the fluid.

10. The method of claim 7, the method further comprising measuring the temperature of the fluid by a temperature meter; and
feeding the information on said temperature to the frequency controller of the ultrasound sensor apparatus.

11. The method of claim 7, the method further comprising at least one of the following: receiving, estimating and having information on a change of resonance of the ultrasound sensor apparatus as a function of time; and
controlling the frequency of the ultrasound by adjusting the frequency of the ultrasound output by the at least one ultrasound transmitter based on the change and time of the change.

12. An ultrasound flow sensor apparatus, wherein the ultrasound flow sensor apparatus comprises at least one ultrasound transmitter, which is configured to output ultrasound into flowing fluid, a frequency controller, which is configured to receive information on temperature of the fluid and feedback from the at least one ultrasound transmitter, and lock a frequency of the ultrasound output to driving frequency of the at least one ultrasound transmitter to lock a sensor resonance to driving frequency in order to control the frequency of the ultrasound output by the at least one ultrasound transmitter as a function of the temperature of the fluid.

13. The apparatus of claim 12, wherein the frequency controller is configured to adjust relation between ultrasound frequency and speed of the sound in the fluid as a function of the temperature of the fluid.

14. The apparatus of claim 12, wherein the frequency controller is configured to keep relation between ultrasound frequency and speed of the sound in the fluid constant as a function of the temperature of the fluid.

15. The apparatus of claim 12, wherein the ultrasound sensor apparatus comprises one or more ultrasound receivers, and the ultrasound sensor apparatus is configured to measure the temperature of the fluid based on one or more averages of time-of-flights of the ultrasound that has travelled through the fluid and is received by the one or more ultrasound receivers.

16. The apparatus of claim 12, wherein the ultrasound sensor apparatus comprises a temperature meter, which is configured to measure the temperature of the fluid and feed the information on said temperature to the frequency controller.

17. The apparatus of claim 12, wherein the frequency controller comprises one or more processors; and one or more memories including computer program code; and
the one or more memories and the computer program code are configured to, with the one or more processors, cause apparatus at least to: control the frequency of the ultrasound output by the at least one ultrasound transmitter as a function of the temperature of the fluid.

* * * * *